June 1, 1943.  F. C. ROCKSTROH  2,320,385
SELF-ADJUSTING TAPPET
Filed April 12, 1940
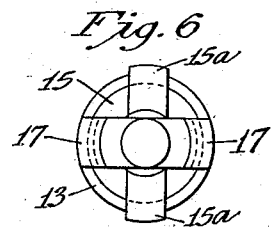
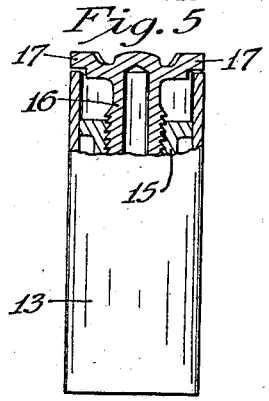
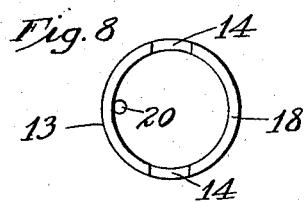
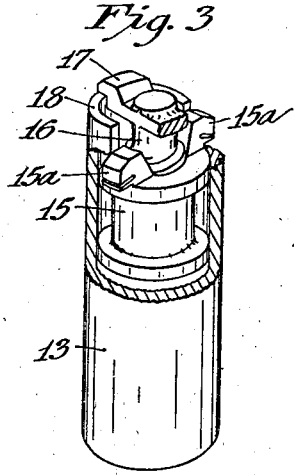
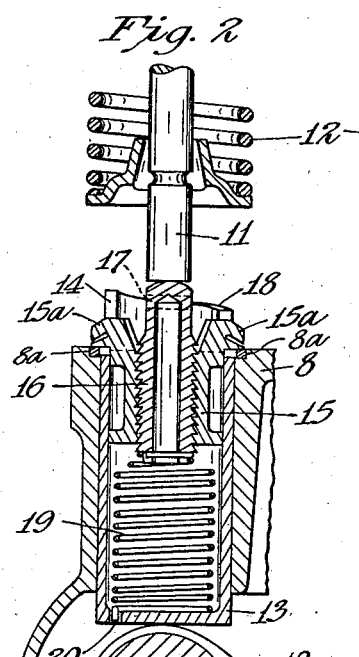
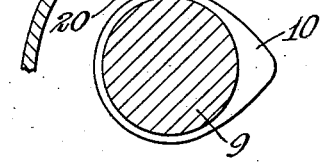
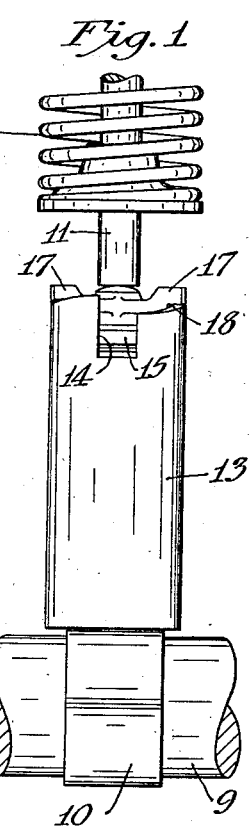
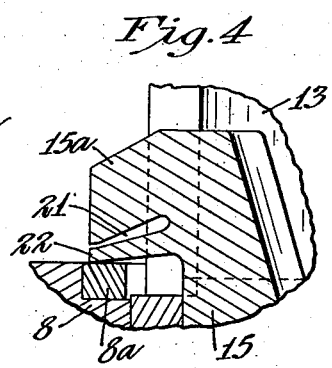
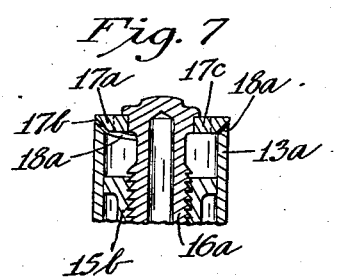
Inventor
Frederick C. Rockstroh
By Williamson & Williamson
Attorneys Patented June 1, 1943

2,320,385

UNITED STATES PATENT OFFICE 2,320,385

SELF-ADJUSTING TAPPET

Frederick C. Rockstroh, Minneapolis, Minn.

Application April 12, 1940, Serial No. 329,232

8 Claims. (Cl. 123—90)

This invention relates to valve tappets and more particularly to self-adjusting tappets for automatically compensating for contraction and expansion in the valve train between the valve and the cam or operating means. It relates to mechanical tappets as distinguished from hydraulic tappets both of which are known in the internal combustion engine field.

Numerous types of mechanical self-adjusting tappets have been designed and in these the relatively movable elements have been threaded together and in combination with a torsion spring have provided means for lengthening and shortening the tappet in response to changes in the valve mechanism.

However, the various means for periodically locking these threaded elements together during transmission of thrust between the cam and the valve in order to prevent slipping of one element in the other, have left these freely slidable threaded surfaces in series with this thrust, thereby subjecting them to adverse conditions or factors for freely sliding frictional surfaces, such as high unit loads and tendency to force out lubrication between the sliding surfaces, such factors being favorable to locking frictional surfaces that are not required to slip at any time.

In the prior developments these adverse factors are disadvantageous because sliding frictional surfaces require materials, hardness, finish, shape, and unit load of a degree to maintain good lubrication for smooth, sliding action, while locking frictional surfaces require factors having opposite qualities.

One object in my construction is to provide a tappet wherein the sliding frictional surfaces are free from transmitting thrust, whereby high unit loads on these surfaces are avoided so that good lubrication can be maintained between these surfaces for smooth, sliding action, prevention of wear and lateral misalignment, and, therefore, for substantially more durable operation.

Another object is to provide a tappet mechanism having relatively movable elements comprising freely slidable surfaces wherein the elements are responsive to expansion in the valve, and means for periodically and yieldably disposing these surfaces in series with the expanded valve so as to avoid imposing high unit loads on said surfaces.

Another object of the invention is to provide means independent of the relatively freely slidable surfaces which permits locking of the movable elements when the desired adjustment has taken place without imposing high unit pressures on said surfaces.

A more specific object of the invention is to provide two sets of cooperating frictional surfaces one of which is designed to permit free relative sliding movement and another of which is designed to lock to prevent movement between the relatively freely movable surfaces while maintaining the freely slidable surfaces free of high unit pressures.

A further object of the invention is to provide improved means for maintaining a small predetermined distance of clearance or lash in the valve train regardless of the adjusted position to which the tappet is automatically moved.

These and other objects and advantages of the invention will more fully appear from the following description made in connection with the accompanying drawing, wherein like reference characters refer to the same parts throughout the views, and, in which:

Fig. 1 is a side elevation of a tappet showing portions of an engine valve and spring and a fragment of a cam shaft with a cam thereon;

Fig. 2 is a vertical section through the structure shown in Fig. 1;

Fig. 3 is a fragmentary perspective of the tappet in part section;

Fig. 4 is an enlarged fragmentary section of the upper portion of the tappet illustrating the yieldable shoulder construction of the nut;

Fig. 5 is a side elevation of the tappet with the upper portion broken away;

Fig. 6 is a plan view of the structure in Fig. 5;

Fig. 7 is a fragmentary section showing a modified type of construction; and

Fig. 8 is a plan view of the sleeve.

In the drawing there is illustrated a portion of an internal combustion engine cylinder block 8, a cam shaft 9 having a cam 10 thereon, a valve stem 11, and a valve spring 12. Riding on the cam is a casing or sleeve 13 whose lower end is closed and whose upper end is open. The upper portion of the sleeve 13 is provided with a pair of oppositely disposed cutout portions 14 which are adapted to receive lateral extensions 15a of a nut 15 which is positioned within the cylinder. The nut 15 has a threaded bore extending axially therethrough and into this bore is threadedly received a bolt or rotor 16. The rotor has a pair of oppositely disposed radial arms 17 which extend over the top of the wall of sleeve 13. This top wall portion constitutes a pair of helical ramps 18 with which the rotor arms 17 are in periodic frictional contact. It will be seen that the rotor 16 has an upstanding cylindrical portion upon which the valve stem 11 is adapted to rest. Positioned within the sleeve 13 is a torsion spring 19 whose lower end is anchored in an opening 20 in the bottom end of the sleeve and whose upper end is suitably secured to the bottom end of the rotor 16. The spring 19 is under a torsional strain so that it normally tends to exert a twisting force on the rotor. It is also kept under compression so that the cylinder is urged against the cam.

The lateral extensions 15a on the nut 15 are shown provided with cut-out portions 21 thus providing relatively thin resilient tongues 22. The gap provided by the cut-out 21 is of a pre-determined size to provide for cushioning of contact during increments of expansion of the valve. Tongues 22 substantially resist deflection from the comparatively small axial force resulting from the torsion spring 19. The rigid portion of extension 15a, of course, limits the yieldable movement of the tongues 22. When the guide material itself cannot be hardened it is desirable to insert a hardened ring 8a in the top of the guide to receive the contact of the extensions of the unit 15a to lessen wear.

The structure described shows a pair of helical ramps 18 which have faces similar to a square thread. In Fig. 7, however, there is shown a modified form of construction in which the sleeve 13a is provided with a pair of ramp surfaces 18a which incline inwardly and downwardly with respect to the sleeve wall similar to one face of a V thread. In the sleeve is a nut 15b into which is threaded a rotor 16a. The nut 15b is, of course, provided with arms similar to the arms 15b in Figs. 1 through 4 and is fitted in slots such as are provided in the sleeve 13. This rotor has a pair of oppositely extending radial arms 17a which have slanting faces 17b disposed at the same angle as the slanted ramp surfaces 18a. As shown in this view, the arms 17a are formed on a ring-like element 17c, formed separately from rotor 16a. This is one manner in which the coefficient of friction of the ramp surfaces can be increased over that of the threaded surfaces.

The lead of the threads connecting the nut 15 and rotor 16 is such that pressure exerted on the rotor by the valve stem will cause the same to twist in the nut 15 when too little clearance is provided in the valve train. Also when there is too great a clearance the torsion spring 19 will twist the rotor 16 in the opposite direction to take up this excess clearance. Naturally, some means must be provided to lock the rotor with respect to the nut and this is provided by the oppositely extending arms 17 on the rotor which are capable of frictional engagement with the ramps 18 on the sleeve 13. In view of the fact that the threads in the nut and on the rotor must have a free slipping or sliding action I have so designed the tappet that these threads are placed out of the line of thrust between the cam 10 and the valve stem 11. The thrust is transmitted out of series with the threads on the nut and rotor through the wall of the sleeve 13 to the rotor arms 17 and from these arms to the valve stem 11. The lack of pressure between the threads connecting the nut and rotor insures maintenance of lubrication to provide smooth sliding action between said nut and rotor, and there is no wear occasioned by thrust imposed on the threads as is true in the prior art.

The lead and hand of the threads on the rotor and nut are the same as the lead and hand of the two ramp surfaces 18 and these elements are so related that a pre-determined lash distance is maintained between the arms 17 and said ramp surfaces. Since the lead of the threads on nut and rotor and on the ramp surfaces are the same, movement of the rotor 16 will cause this lash distance to be maintained in any adjusted position of the tappet.

In operation, as the cam rotates, it first raises the casing alone a distance equal to the lash when, therefore, the ramp and arm surfaces meet, the tappet is locked and raises further as a unit, maintaining its overall length. The line of thrust transmission is seen to be from the cam through the casing and ramp surfaces, through the arms and head of the rotor to the valve stem, and that the nut is carried along idle, the rotor threads being out of series with thrust transmission. As the tappet nears the base circle of the cam and the valve seats, the shoulders reach their normal position even with the guide surface, (assuming no change in valve length has taken place in this cycle) and the tappet is unlocked when the arm and ramp surfaces separate as the casing continues to follow the cam to the base circle. In this cycle there has been no relative motion between the tappet parts for the purpose of lash readjustment, because there has been no expansion or contraction in the valve stem.

When there is an increment of expansion in the valve during one cycle the new position of the nut will be that increment lower in the casing as the valve seats, so that the flexible shoulder portion 22 yields accordingly, until the tappet unlocks as the casing continues to the base circle, the nut returns to its normal position on the guide surface, the rotor slipping in the threads to rotate the arms slightly, shortening the tappet an increment.

When there is an increment of contraction the new position of the nut will be that increment higher in the casing as the valve seats and the casing continues downward unlocking the rotor so that the torsion spring can turn the rotor slightly until the shoulders contact the guide surface, lengthening the tappet an increment.

It is apparent that the rotor threads, in combination with the spring 19 maintain contact between the rotor and valve stem and between the casing and cam so as to automatically compensate, in overall tappet length, for expansion and contraction in the valve. The threads being of a frictional sliding angle of lead, expansion in the valve forces the rotor inward, and in the case of contraction in the valve, the spring 19 forces the rotor outward, the casing always being urged against the cam. It is also apparent that tappet adjustment is made during the interval in the cycle between the time the valve has seated and the time the valve is unseated, which is about one-half the cycle, and that during reciprocation of the valve the tappet is locked and maintains its overall length. This latter interval, when the valve is held off its seat, is a period of thrust transmission of which the valve spring resistance is a part, so that as the valve seats and the tappet is unlocked, the rotor threads can be said to be disposed in series with valve spring pressure, and disposed out of series with thrust transmission as the tappet locks and raises the valve off its seat. However, when the rotor threads are disposed in series with valve spring pressure, the full measure of such pressure is not disposed onto the threads because the nut supporting portions 22 yield under such pressure, consequently the instantaneous pressure load on the threads is substantially reduced, so that the unit load on the threads is comparatively low, allowing lubrication to remain between these threaded sliding surfaces.

Although the lead of the helical ramps 18 is the same as that of the threads between the nut and rotor, certain factors cause the ramp surfaces to be locking surfaces whereas the contacting thread surfaces on the nut and rotor are freely slidable. Considering the independence of the two sets of frictional surfaces (sliding and locking) relative to the various factors which influence the coefficient of friction between two frictional surfaces, it is apparent that the coefficient of friction of the locking surfaces can be substantially higher than that of the sliding surfaces, nevertheless, for example, let us consider that the materials, hardness, finish and lubrication of the two sets of frictional surfaces is the same so that the coefficients of friction would be the same. Consider the conventional symbol $\mu$ to represent .12 as the coefficient of friction of steel on steel. Then .12 is the tangent of $\theta$, the latter being the limiting angle of friction for these surfaces. In this case the tangent of the rotor thread angle must exceed .12 to permit slippage and the tangent of the ramp angle must be less than .12 to provide for frictional locking. In a .5 inch multiple threaded screw having a lead of .267 and a frictional diameter of .45 then the tangent of the angle of lead of the rotor threads would be $$\frac{.267}{.45\pi} = .188$$

Since the lead of the ramp is also .267 and if the frictional diameter is .98 then the tangent of the angle of lead of the ramp surfaces would be $$\frac{.267}{.98\pi} = .087$$

Since the tangent of the angle of lead of the ramp surfaces is .087 or less than .12, the coefficient of friction above stated, these surfaces will lock under the conditions stated, and in view of the fact that the tangent of the angle of lead of the rotor threads and nut is .188 or greater than the coefficient of friction there will be slippage of the rotor, whereas the rotor arms and their contacting ramp surfaces will be locked. This difference in the tangents of the angles of lead of the two pairs of surfaces is due to the ratio of the two diameters all other things being equal. Of course, however, other conditions may exist to vary the theoretical ration of frictional resistances such as the use of different materials and differently shaped frictional surfaces. For instance, as shown in Fig. 7, the ramp surfaces are inclined inwardly and downwardly toward the center of the casing, so that transverse lines across these helical locking surfaces lie at angles to radii of these surfaces, whereas transverse lines across the helical locking surfaces 18a constitute radii. This angularity greatly increases the frictional resistance of the surfaces of the ramps and the similarly inclined ramp contacting surfaces 17b on the rotor arms. For example, if R is a slidable load acting on and normal to a surface, then the frictional resistance $F = \mu R$, but when R acts on an inclined frictional surface, under circumstances shown in Fig. 7, a different condition exists. If we let A represent the angle of incline from horizontal then $F' = \mu R \sec A$, so that $F'$ will always be greater than F.

Furthermore, the arms can be of different material from the body of the rotor by making these arms integral with a ring which is pressed onto a flanged shoulder on the rotor, as shown in Fig. 7, whereby the materials of the locking elements can be of a higher coefficient of friction than the materials of the sliding elements.

From the foregoing description it will be seen that I have provided a self-adjusting mechanical tappet which utilizes frictional values to lock the tappet and to permit automatic adjustment of the same. The freely slidable threaded connection between the rotor and the nut is in no way subjected to thrust transmitted from the cam to the valve stem, and consequently these surfaces are more durably maintained responsive to incremental relative movement. And while the rotor is freely movable insofar as its threaded connection with the nut is concerned, it is true that the helical ramps 18 positively lock the rotor against movement when the casing 13 is riding the high portion of the cam 10. Furthermore, regardless of the position of the rotor relative to the nut 15 and the ramp surfaces 18 there will always be the desired predetermined amount of lash because of the identity of lead of the rotor threads and the ramp surfaces. The tappet is of relatively simple structure and while it is, of course, necessary to accurately produce the proper lead in the threads and ramp surfaces, there is no great amount of exact machine work necessary. For lubrication of the rotor threads and other movable parts of the tappet, all of these parts are exposed to advantage in the use of conventional tappet lubrication.

It will, of course, be understood that various changes may be made in the form, details, arrangement and proportions of the various parts without departing from the scope of my invention.

What is claimed is:

1. A tappet for use between a valve and an operating means comprising, a pair of elements positioned between said valve and said operating means and movable relative to each other axially of the valve and also movable as a unit axially of said valve, said tappet including means subject to thrust between said operating means and valve for locking said elements against relative movement, means adjacent one of said elements for limiting axial movement of said element between said operating means and said valve, and a yieldable abutment member on said last mentioned relatively movable element and periodically in abutment with said movement limiting means to periodically relieve said locking means from thrust between said operating means and valve.

2. A tappet for use between a valve and an operating means comprising, a pair of relatively rotatable elements having portions with helical sliding contact surfaces, another portion of one of said elements having a helical frictionally locking contact surface of the same hand as said first mentioned surfaces, means for periodically engaging said locking surface, said elements being composed of materials of a substantially uniform coefficient of friction, and said tappet including means for varying relative positions of said elements in response to variations in distance between said valve and its operating means.

3. A tappet for use between a valve and an operating means comprising, a reciprocating body, a pair of elements slidably mounted as unit in said body and having portions helically interconnected for relative movement to vary the overall length of said elements, means connected to at least one of said elements for adjustably increasing said overall length of said elements and helical means associated with one of said elements and said body and positioned between said valve and operating means to transmit thrust between said valve and operating means, and said helically interconnected portions of said pair of elements being positioned out of thrust transmitting relationship between said valve and operating means.

4. The structure in claim 3 and said thrust transmitting helical means comprising interengaged portions, one of said portions having a frictional angle of helix of the same hand as said interconnected helical portions and constituting means for periodically locking the parts of said tappet together.

5. The structure in claim 3 and said interengaged portions having correlated surfaces inclined radially toward the axes of said elements to increase the locking effectiveness of said tappet.

6. A tappet for use between a valve and an operating means comprising, a pair of elements having interconnected helical portions, said elements being relatively rotatable through said interconnected helical portions to permit variations in their overall length in response to variations in distance between said valve and operating means, one of said elements having a second helical portion of the same hand as said first mentioned interconnected helical portions, means for adjustably increasing the overall length of said elements, and a member positioned between said valve and operating means in thrust transmitting relationship thereto and also positioned to periodically engage said second helical portion, and said first mentioned interconnected helical portions being positioned out of thrust transmitting relationship between said valve and said operating means.

7. The structure in claim 6 and said interconnected helical portions having a frictional sliding angle of helix, and said second helical portion having a frictional locking angle of helix of the same lead as said sliding angle of helix.

8. The structure in claim 6 and said tappet including a body within which said pair of elements is received, said pair of elements being axially slidable as a unit relative to said body and being non-rotatable as a unit relative to said body.

FREDERICK C. ROCKSTROH.